(12) United States Patent
Su et al.

(10) Patent No.: US 9,954,727 B2
(45) Date of Patent: Apr. 24, 2018

(54) AUTOMATIC DEBUG INFORMATION COLLECTION

(71) Applicant: Quanta Computer Inc., Taoyuan (TW)

(72) Inventors: Mei-Lin Su, Taoyuan (TW);
Ming-Hung Hung, Taoyuan (TW);
Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 171 days.

(21) Appl. No.: 14/791,661

(22) Filed: Jul. 6, 2015

(65) Prior Publication Data
US 2016/0261455 A1    Sep. 8, 2016

Related U.S. Application Data

(60) Provisional application No. 62/129,681, filed on Mar. 6, 2015.

(51) Int. Cl.
*H04L 12/24*    (2006.01)

(52) U.S. Cl.
CPC ........ *H04L 41/069* (2013.01); *H04L 41/0686* (2013.01)

(58) Field of Classification Search
CPC .................................................. H04L 41/0686
USPC ........................................................ 709/224
See application file for complete search history.

(56) References Cited

U.S. PATENT DOCUMENTS

| 7,860,961 B1 * | 12/2010 | Finkelstein | ......... H04L 12/4641 |
| | | | 709/201 |
| 2014/0289570 A1 * | 9/2014 | Lewis | ................. G06F 11/3089 |
| | | | 714/43 |

* cited by examiner

*Primary Examiner* — Adnan Mirza
(74) *Attorney, Agent, or Firm* — Nixon Peabody LLP; Zhou Lu; Eduardo J. Quinones (57) ABSTRACT

A baseboard management controller (BMC) of a system can retrieve logged system events from a non-volatile storage of the BMC and receive a command from an administrator device for the BMC to collect system debug information. The BMC can obtain debug information from a component of the system, in response to receiving the command. The BMC can save the debug information to a debug file and send the debug file to the administrator device.

20 Claims, 7 Drawing Sheets

AUTOMATIC DEBUG INFORMATION COLLECTION

RELATED APPLICATIONS

This application claims priority of U.S. Provisional Application No. 62/129,681, filed on Mar. 6, 2015, and entitled "AUTOMATIC DEBUG INFORMATION COLLECTION", the contents of which are hereby incorporated by reference in its entirety for all purposes.

BACKGROUND

Field

This application relates to managed computer systems, and more particularly to a system and method for automatically collecting debug information in a server device.

Background

A number of techniques have been developed to remotely manage the operation of computer servers in a manner that provides accessibility, consistency, and efficiency. Remote management allows the removal of input/output interfaces (e.g., monitors, keyboards, and mice) for the servers. For example, large data centers containing numerous rack servers are commonly managed using a variety of remote management tools, such as simple terminal connections, remote desktop applications, and software tools used to configure, monitor, and troubleshoot server hardware and software.

Server devices can malfunction from time to time. The malfunctions can originate from normal wear and tear from prolonged use, changes in hardware configurations, changes in software or firmware, external damage, etc. An administrator in charge of repairs may need to first determine the cause or source of the malfunction. For example, the administrator may wish to know what phase the server hangs.

SUMMARY

The following presents a simplified summary of one or more implementations in order to provide a basic understanding of present technology. This summary is not an extensive overview of all contemplated implementations of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method is provided for automatic debug information collection. A baseboard management controller (BMC) of a system retrieves logged system events from a non-volatile storage of the BMC and receives a command from an administrator device for the BMC to collect system debug information. The BMC obtains debug information from a component of the system, in response to receiving the command. The BMC saves the debug information to a debug file and sends the debug file to the administrator device.

In some implementations, a system includes a baseboard management controller (BMC) and a non-transitory computer-readable medium. The non-transitory computer-readable medium includes instructions which, when executed by the BMC, causes the BMC to: retrieve logged system events from a non-volatile storage of the BMC; receive a command from an administrator device for the BMC to collect system debug information; obtain debug information from a component of the system, in response to receiving the command; save the debug information to a debug file; and send the debug file to the administrator device.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for automatically collecting debug information in a server device using a baseboard management controller. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. Any implementation described herein as an "example" is not necessarily to be construed as preferred or advantageous over other implementations.

Malfunctions in server devices can be due to normal wear and tear from prolonged use, changes in hardware configurations, changes in software or firmware, external damage, etc. An administrator in charge of repairs may need to first determine the cause or source of the malfunction. The administrator may wish to know what phase the server hangs (i.e., malfunction causing a freeze, where the system ceases to function or respond to inputs). For example, the server may hang during power-on self-test (POST), after booting into an operating system (OS), etc. The administrator may wish to know which, if any, hardware component has failed. For example, a malfunction may have occurred in a memory, Peripheral Component Interconnect (PCI), a hard disk drive (HDD), etc. The administrator may wish to know hardware configuration information of the server, such as identifications of processor, memory, power supply unit (PSU), system board, etc. and whether any add-on cards are installed and their identifications. The administrator may also wish to know contents of error related chipset registers around the time of malfunction.

Figure 1:
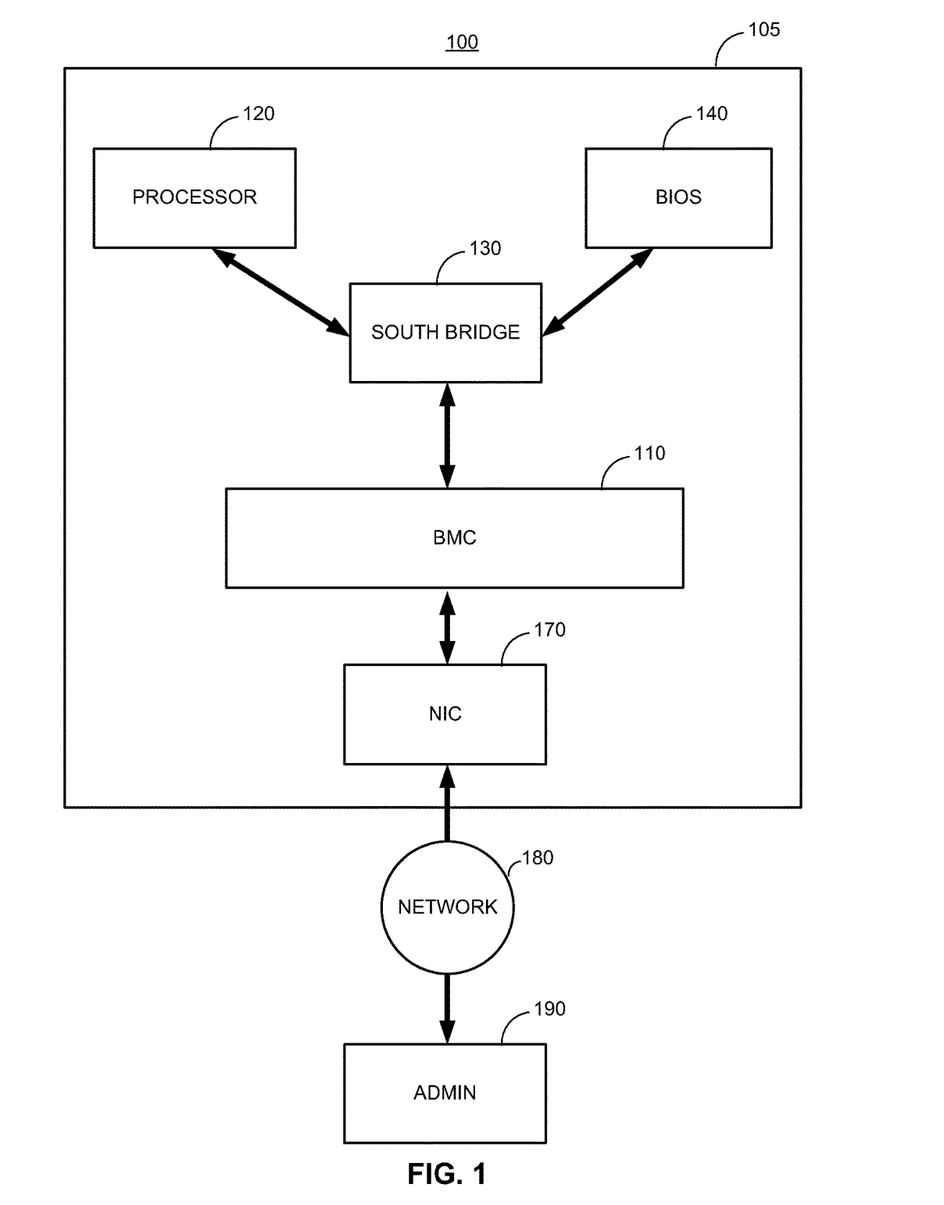
FIG. 1 illustrates a block diagram of an example system for automatic debug information collection.

FIG. 1 illustrates a block diagram of an example system 100 for automatic debug information collection. The system 100 can include a server 105 (e.g. one of many computer servers in a data center) connected to administrator device 190 through a network 180. The administrator device 190 can send a command over the network 180 to the server 105 to cause the server 105 to start automatically collecting debug information from a variety of sources within server 105.

The server 105 can include a specialized microcontroller such as a baseboard management controller (BMC) 110. The BMC 110 can be embedded on a motherboard of the server 105. The BMC 110 can manage interfaces between system management software and platform hardware. The BMC 110 can allow for out-of-band management of the server 105. For example, a network administrator using the administrator device 190 can remotely command the BMC 110 to automatically collect debug information or to receive collected debug information from the BMC 110. The BMC 110 can collect debug information from itself as well from as other server components such as a southbridge 130, a processor 120, a Basic Input/Output System (BIOS) 140, etc.

For example, the non-volatile memory associated with BMC 110 can include a system event log (SEL). The SEL can include a logged record of regular and abnormal system events, such as, for example, a power button press, an operating system load completion, a processor overheat error, a memory error, etc. The system events can be useful to the network administrator in discovering a cause of server malfunction. The system events can be recorded using information received from the BIOS 140, a management engine, or the operating system.

The BIOS 140 can include a BIOS chip located on the motherboard of the server 105 for storing a BIOS software program. The BIOS 140 can store firmware executed when the server 105 is first powered on along with a set of configurations specified for the BIOS 140. The management engine can be an isolated coprocessor embedded on a chipset of the server 105. The operating system can be software that manages the server's 105 hardware and software resources and provides services for software applications.

In some implementations, the BMC 110 can capture a screenshot of a display or console output associated with server 105. For example, when an error occurs in server 105, server 105 may hang and the output (e.g., graphical user interfaces, log messages, etc.) presented on the display or sent to the console of server 105 can be used to debug the error. For example, the BMC 110 can capture the screenshot using an integrated video graphics array (VGA) of the BMC 110 or can capture a screenshot from video data received from a graphics device of the server 105.

In some implementations, in the event of an error, the BMC 110 can receive chipset register settings related to the error from a chipset register (e.g., Model Specific Register, Configuration Space Register, etc.), described further below with reference to FIGS. 2 and 3. In some implementations, the BMC 110 can receive hardware configuration information from the BIOS 140, described further below with reference to FIG. 4. In some implementations, the BMC 110 can request the BIOS 140 to send to the BMC 110 the hardware configuration information, in response to receiving a command from the administrator device 190 to collect debug information. In some implementations, the BIOS 140 is configured to automatically send on system startup the hardware configuration information to the BMC 110. In some implementations, the BMC 110 can then summarize the hardware configuration information in a report that includes central processing unit (CPU) topology, memory topology, expansion slot topology, etc.

In some implementations, the BMC 110 can direct the BIOS 140 to send a power-on self-test (POST) redirect message to obtain detailed system startup information, described further below with reference to FIG. 5.

The processor 120 (e.g., central processing unit (CPU)) can be a chip on a motherboard of the server 105 that can retrieve and execute programming instructions stored in a memory. The processor 120 can be a single CPU with a single processing core, a single CPU with multiple processing cores, or multiple CPUs.

The southbridge 130 can be a chip on a motherboard of the server 105 connected to the processor 120. The southbridge 130 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the server 105. In some implementations, the southbridge 130 can connect to the BMC 110 or can include Direct Memory Access (DMAs) controllers, Programmable Interrupt Controllers (PICs), and a real-time clock.

The BMC 110 can communicate with other components in the server 105 using the Intelligent Platform Management Interface (IPMI). IPMI is a set of specifications for an autonomous computer subsystem that manages and monitors a computer system's central processing unit (CPU), firmware, and operating system, and for out-of-band management and monitoring by system administrators. In some implementations, the BMC 110 can connect to the south bridge 130 or the NIC 170 using any bus interface such as system management bus (SMBus), RS-232 serial bus, Inter-Integrated Circuit (IIC or I²C) protocol, Ethernet, Intelligent Platform Management Bus (IPMB), etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing. In some implementations, the BMC 110 can communicate with the BIOS 140 through a General Purpose Input/Output (GPIO) interface.

The BMC can connect to the network 180 using a network interface controller (NIC) 170. The NIC 180 can include computer hardware components that allow a computing device to communicate over the network 180. The NIC 170 can connect to the administrator device 190 through the network 180. The network 180 can, for example, include a local area network (LAN) or a wide area network such as the Internet. The administrator device 190 can be a device such as a computer system that can send command or inputs to the BMC 110 as well as receive information from the BMC 110.

Figure 2:
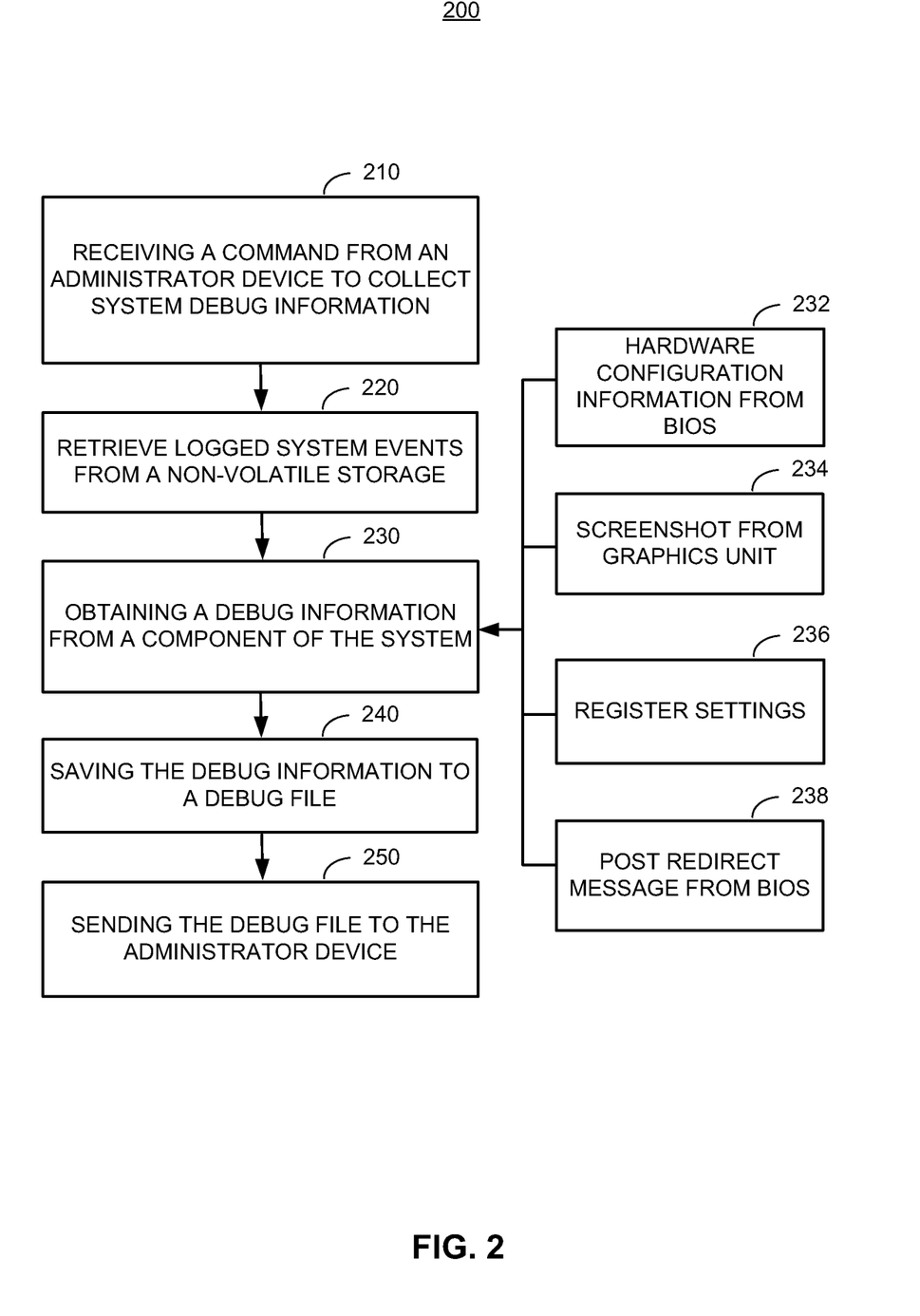
FIG. 2 is a flow diagram of an example process for automatically collecting debug information in a server by a baseboard management controller.

FIG. 2 is a flow diagram of an example process 200 for automatically collecting debug information in a server by a baseboard management controller. At step 210, the BMC can receive a command from an administrator device to collect system debug information.

At step 220, the BMC can retrieve logged system events from a non-volatile storage of the BMC. For example, the logged system events can include records of regular and abnormal system events, such as, for example, a power button press, an operating system load completion, a processor overheat error, a memory error, etc. The logged system events can be useful to the network administrator in discovering a cause of server malfunction. The logged system events can be recorded using information received from the BIOS, a management engine, or the operating system.

At step 230, the BMC can obtain debug information from a component of the system. In some implementations, at step 232, the BMC can collect the debug information from a BIOS, in response to receiving the command from the administrator device. For example, the debug information can include hardware configuration information for the system. In some implementations, the BMC can request the BIOS to send to the BMC the hardware configuration information, in response to receiving the command. In some other implementations, BIOS can be configured to automatically send on system startup the hardware configuration information to the BMC. In some implementations, obtaining the debug information can be based on the logged system events. For example, when the BMC receives a command to collect system debug info, the BMC can retrieve the system logs from the non-volatile storage of the BMC, check if a unexpected event has occurred before system hang, and run a register dump. In an optional step, the BMC can summarize the hardware configuration information in a report comprising central processing unit (CPU) topology, memory topology, expansion slot topology, hardware identification, or hardware network address. For example, the report can include information on which memory slots are populated, which expansion slots contain expansion cards, a MAC address of a local area network (LAN) card, or HDD info for an installed HDD.

In some implementations, at step 234, the BMC can collect the debug information from a graphics unit, in response to receiving the command from the administrator device. For example, the debug information can include a screenshot of the system hanging captured by the graphics unit. In some implementations, the graphics unit can be integrated into the BMC.

In some implementations, at step 236, the BMC can collect the debug information including register settings for at least one of a register of a processor, a south bridge, or another device connected to the processor or the south bridge. For example, the BMC can either obtain all register settings or obtain only register settings related to a specific error event. In some implementations, the BMC can receive the register settings through a PECI or a SMLink from the processor or southbridge. In some implementations, the BMC can analyze the logged system events recorded in the non-volatile storage of the BMC to determine the specific error event causing a system hang or other such malfunction. In addition, the BMC can obtain register settings for registers related with the specific error determined.

In some implementations, at step 238, the BMC can collect the debug information from a BIOS of the system, in response to receiving the command from the administrator device. For example, the debug information can include a POST redirect message with detailed POST debug information. The POST debug information can include register settings for various registers in a chipset or processor in the system, POST progress checkpoints, temperature critical warning, CPU voltage out of range, battery failure, expansion slot error, incorrect, memory configuration, complementary metal-oxide-semiconductor (CMOS) failure, etc. In some implementations, the BMC can direct the BIOS to enable a debug mode and send the POST redirect message to the BMC. For example, directing the BIOS can include setting a debug mode BIOS flag to indicate to the BIOS to enter the BIOS debug mode.

At step 240, the BMC can save the debug information to a debug file. For example, the debug information can be compressed using a compression format (e.g., ZIP, RAR, etc.) into a compressed debug file.

At step 250, the BMC can send the debug file to the administrator device. In some implementations, the BMC can send the debug file to a NIC for transmission over a network to the administrator device. For example, the BMC can connect to the NIC through a connection specified by IPMI (e.g. SMBUS, RS-232, IPM). The NIC can connect to the administrator device through a network (e.g. LAN, Internet, etc.).

Figure 3:
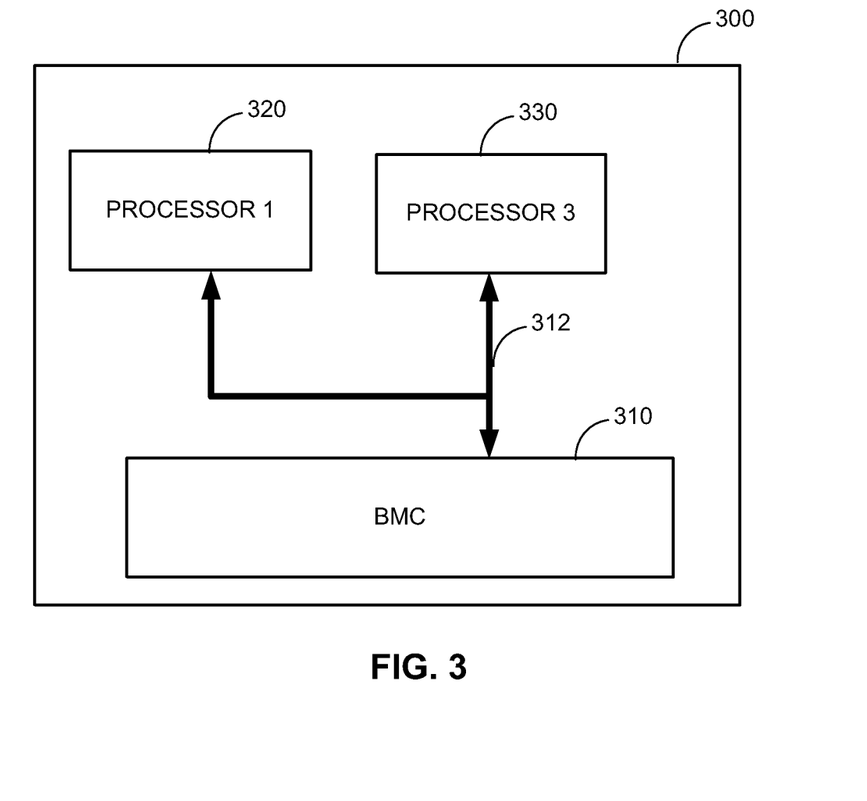
FIG. 3 illustrates a block diagram of an example of a baseboard management controller (BMC) connected to multiple processors.

FIG. 3 illustrates a block diagram of an example of a BMC 310 connected to multiple processors 320, 330. In some implementations, in the event of an error, the BMC 310 of a server 300 can receive chipset register settings related to the error from a chipset register in the processors 320, 330 such as a Model Specific Register, configuration Space Register, etc. In some implementations, the BMC 310 can receive the chipset register settings using a Platform Environment Control Interface (PECI) 312 from the processors 320, 330. PECI 312 uses a single wire for self-clocking and data transfer from each processor 320, 330. PCEI 312 allows read access to error and status monitoring registers in the processors 320, 330.

Figure 4:
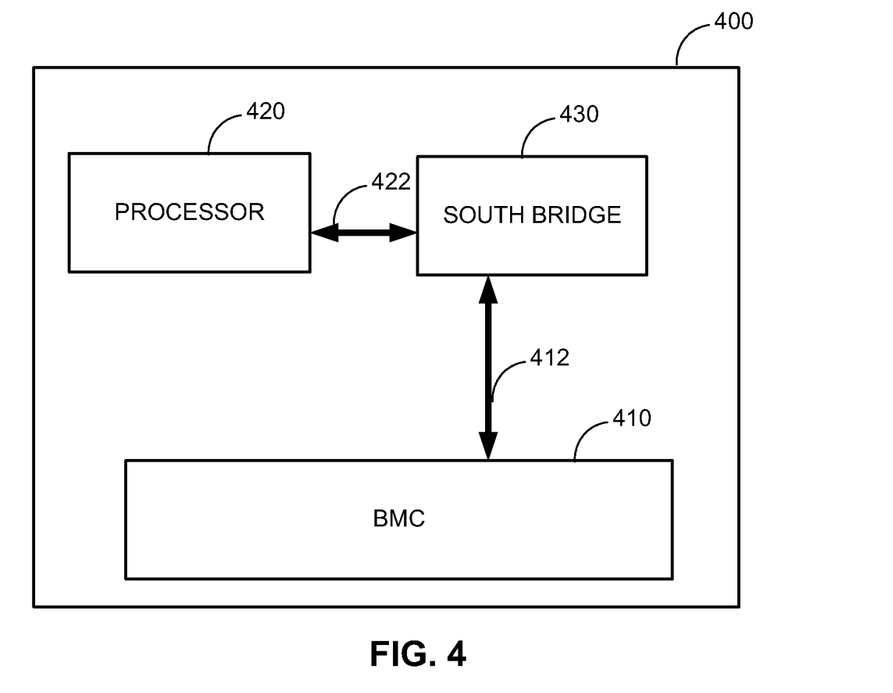
FIG. 4 illustrates a block diagram of an example a BMC connected to a single processor.

FIG. 4 illustrates a block diagram of an example a BMC connected to a single processor. In some implementations, in the event of an error, the BMC 410 of a server 400 can receive chipset register settings related to the error from a chipset register in the processor 420 such as a Model Specific Register, configuration Space Register, etc. For example, the BMC 410 can receive the chipset register settings from the processor 420 through a south bridge 430 on a motherboard of the server 400. The southbridge 430 can connect to the processor 420 using a Platform Environment Control Interface (PECI) 422 from the processors 420. The BMC 410 can connect to the southbridge 430 using a System Management Link (SMLink) bus 412.

Figure 5:
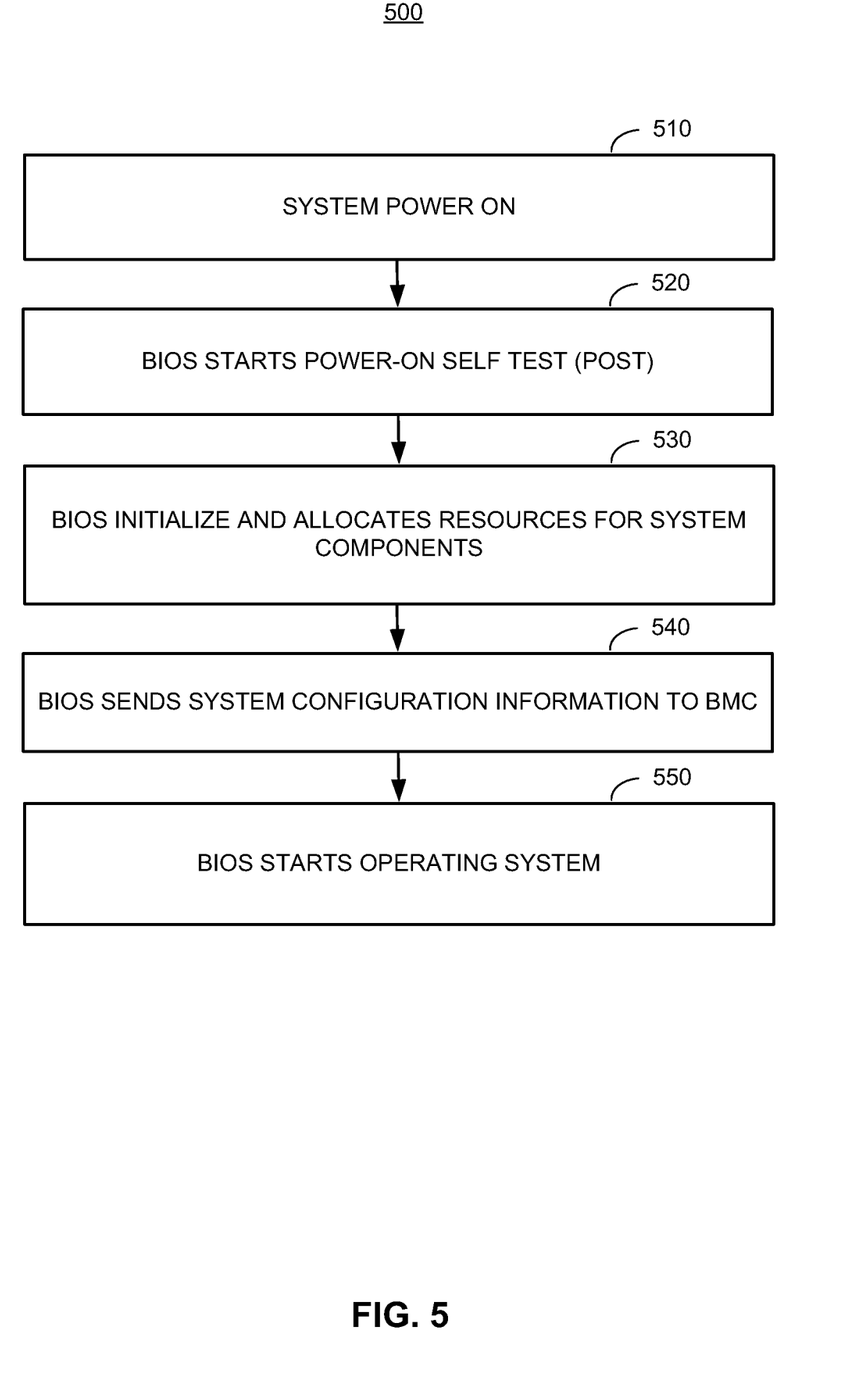
FIG. 5 is a flow diagram of an example process for obtaining system configuration information from a Basic Input/Output System (BIOS)

FIG. 5 is a flow diagram of an example process 500 for obtaining system configuration information from a BIOS. At step 510, a system can be powered on.

At step 520, a BIOS can start power-on self-test (POST). POST can test functionality of various hardware components such as hard disk drives, optical reading devices, cooling devices, memory modules, expansion cards and the like.

At step 530, the BIOS can initialize and allocate resources for system components such as processors, memory, PCI-Express cards etc. For example, the BIOS can address and allocate an area in memory for a PCI-Express card to use after entering operation system.

At step 540, the BIOS can send system configuration information to a BMC. The BIOS of a system typically stores hardware configuration information of the system. For example, the system configuration information of the system can include identification and model type information for processors, memory, PCI-Express cards, storage devices, etc. In some implementations, the BIOS can send the system configuration information to the BMC using a connection specified by IPMI.

In some implementations, the BMC can request the BIOS to send to the BMC the hardware configuration information, in response to receiving a command from an administrator device to collect debug information. In some implementations, the BIOS is configured to automatically send on system startup the hardware configuration information to the BMC. Finally, at step 550, the BIOS can start an operating system.

Figure 6:
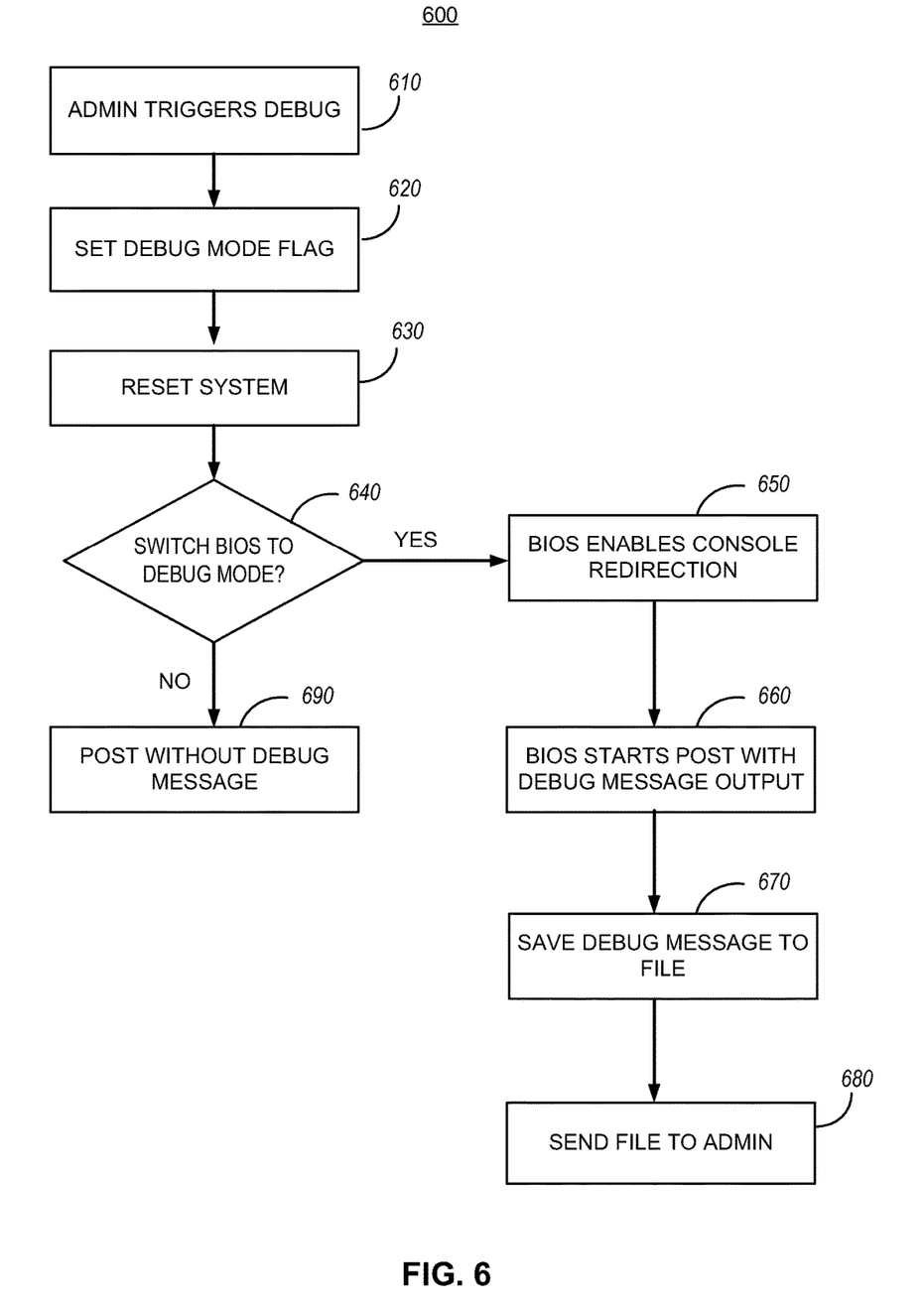
FIG. 6 is a flow diagram of an example process for obtaining a power-on self-test (POST) redirect message from a BIOS.

FIG. 6 is a flow diagram of an example process 600 for obtaining a POST redirect message from a BIOS. A POST process can include a large number of complex steps such as a CPU test and initialization, chipset early-phase initialization before memory initialization, memory testing and initialization, chipset post-phase initialization after memory initialization, peripheral detection, resource allocation, etc. The BIOS of a system can output one-byte of information (i.e., a progress code) for which step of the POST is currently running. However, the BIOS may not, by default, output detailed debug information (e.g., register settings, etc.). Process 600 provides a mechanism by which the BMC can configure the BIOS to redirect detailed POST console output messages to the BMC so that the BMC can provide the detailed POST output to the system administrator to aid in debugging the server system.

At step 610, an administrator using an administrator device can trigger an automatic debug collection for a BMC of a system. At step 620, the BMC can set a debug mode flag to cause a next system startup to switch to a debug mode. For example, the debug mode flag can be set on if the system hangs before booting to an operation system.

At step 630, the system can be reset. For example, the system can be reset by a command from the administrator or automatically by the BMC or the BIOS. In some implementations, the BMC only sets the debug mode flag and resets the system when the system hangs before booting to the operating system.

At step 640, the BIOS can communicate with the BMC to determine whether to switch to debug mode by based on a debug mode flag. If the debug mode flag is set, the BIOS will enable the debug mode at step 650. If the debug mode flag is not set, at step 690, the BIOS will POST without sending detailed debug information.

In some implementations, the BIOS can communicate with the BMC through a hardware wired signal between south bridge and BMC. For example, the hardware wired signal can be transmitted through a General Purpose Input/Output (GPIO) interface. In some implementations, the BIOS can communicate with the BMC through an Intelligent Platform Management Interface (IPMI).

The BIOS can enable the debug mode at step 650. At step 660, the BIOS can redirect the detailed POST debug information to console output. For example, the detailed POST debug information can include register settings for various registers in a chipset or processor in the system, POST progress checkpoints, temperature critical warning, CPU voltage out of range, battery failure, expansion slot error, incorrect, memory configuration, complementary metal-oxide-semiconductor (CMOS) failure, etc.

At step 670, the BMC can receive the console output of the detailed debug information from the BIOS and save the detailed debug information to a debug file on a non-volatile memory. At step 680, the BMC can send the debug file to the administrator device through a network (e.g., LAN or Internet, etc.).

Figure 7:
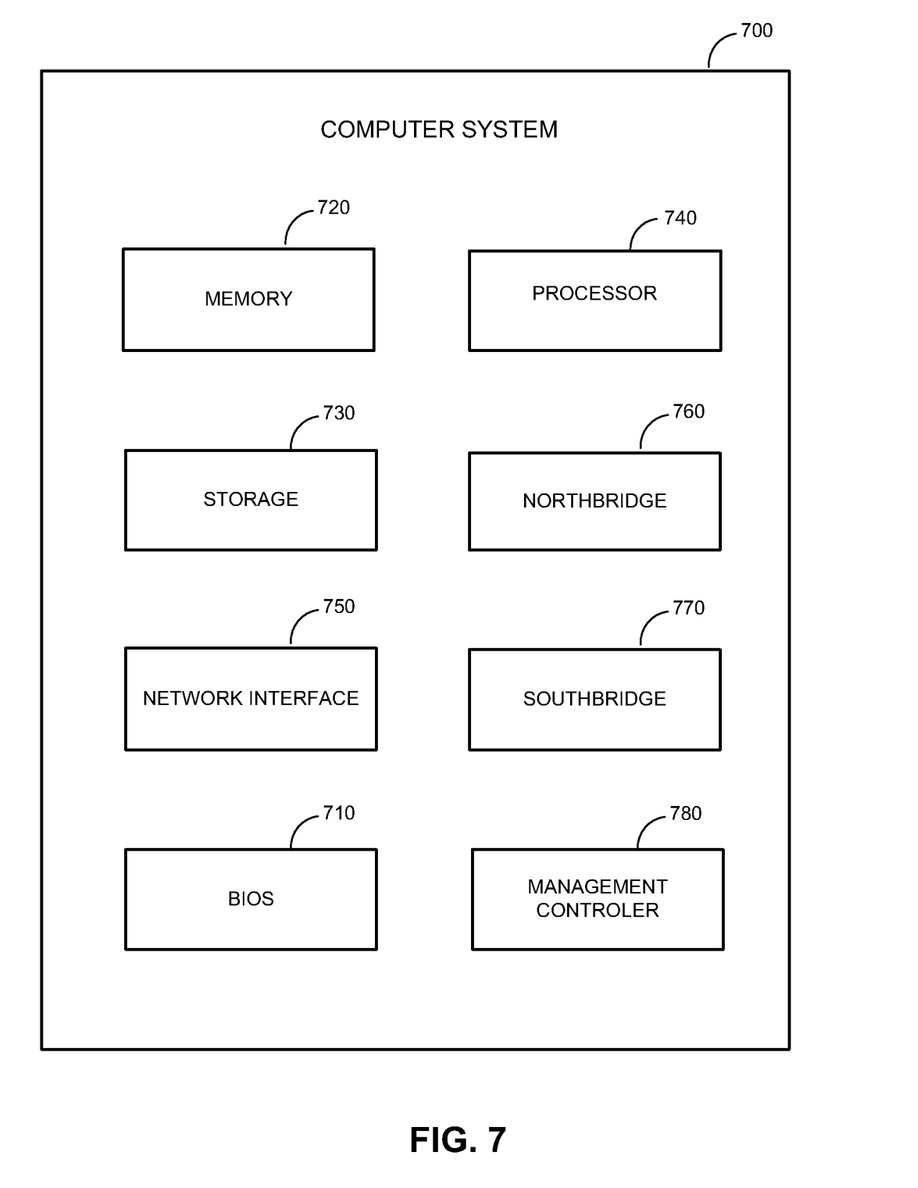
FIG. 7 illustrates a block diagram of an example computer system.

FIG. 7 illustrates a block diagram of an example computer system 700. The computer system 700 can include a processor 740, a network interface 750, a management controller 780, a memory 720, a storage 730, a BIOS 710, a northbridge 760, and a southbridge 770.

The computer system 700 can be, for example, a server (e.g., a server in a server rack of a data center) or a personal computer. The processor (e.g., central processing unit (CPU)) 740 can be a chip on a motherboard that can retrieve and execute programming instructions stored in the memory 720. The processor 740 can be a single CPU with a single processing core, a single CPU with multiple processing cores, or multiple CPUs. One or more buses (not shown) can transmit instructions and application data between various computer components such as the processor 740, memory 720, storage 730, and networking interface 750.

The memory 720 can include any physical device used to temporarily or permanently store data or programs, such as various forms of random-access memory (RAM). The storage 730 can include any physical device for non-volatile data storage such as a HDD or a flash drive. The storage 730 can have a greater capacity than the memory 720 and can be more economical per unit of storage, but can also have slower transfer rates.

The BIOS 710 can include a legacy Basic Input/Output System or its successors or equivalents, such as an Extensible Firmware Interface (EFI) or Unified Extensible Firmware Interface (UEFI) BIOS. The BIOS 710 can include a BIOS chip located on a motherboard of the computer system 700 storing a BIOS software program. The BIOS 710 can store firmware executed when the computer system is first powered on along with a set of configurations specified for the BIOS 710. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 710 can be loaded and executed as a sequence program each time the computer system 700 is started. The BIOS 710 can recognize, initialize, and test hardware present in a given computing system based on the set of configurations. The BIOS 710 can perform self-test, such as a Power-on-Self-Test (POST), on the computer system 700. This self-test can test functionality of various hardware components such as hard disk drives, optical reading devices, cooling devices, memory modules, expansion cards and the like. The BIOS can address and allocate an area in the memory 720 in to store an operating system. The BIOS 710 can then give control of the computer system to the OS.

The BIOS 710 of the computer system 700 can include a BIOS configuration that defines how the BIOS 710 controls various hardware components in the computer system 700. The BIOS configuration can determine the order in which the various hardware components in the computer system 700 are started. The BIOS 710 can provide an interface (e.g., BIOS setup utility) that allows a variety of different parameters to be set, which can be different from parameters in a BIOS default configuration. For example, a user (e.g., an administrator) can use the BIOS 710 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 780 can be a specialized microcontroller embedded on the motherboard of the computer system. For example, the management controller 780 can be a baseboard management controller (BMC). The management controller 780 can manage the interface between system management software and platform hardware. Different types of sensors built into the computer system can report to the management controller 780 on parameters such as temperature, cooling fan speeds, power status, operating system status, etc. The management controller 780 can monitor the sensors and have the ability to send alerts to an administrator via the network interface 750 if any of the parameters do not stay within preset limits, indicating a potential failure of the system. The administrator can also remotely communicate with the management controller 780 to take some corrective action such as resetting or power cycling the system to restore functionality.

The northbridge 760 can be a chip on the motherboard that can be directly connected to the processor 740 or can be integrated into the processor 740. In some instances, the northbridge 760 and the southbridge 770 can be combined into a single die. The northbridge 760 and the southbridge 770, manage communications between the processor 740 and other parts of the motherboard. The northbridge 760 can manage tasks that require higher performance than the southbridge 770. The northbridge 760 can manage communications between the processor 740, the memory 720, and video controllers (not shown). In some instances, the northbridge 760 can include a video controller.

The southbridge 770 can be a chip on the motherboard connected to the northbridge 760, but unlike the northbridge 760, is not directly connected to the processor 740. The southbridge 770 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 700. The southbridge 770 can connect to or can include within the southbridge 770 the management controller 770, Direct Memory Access (DMAs) controllers, Programmable Interrupt Controllers (PICs), and a real-time clock. In some instances, the southbridge 770 can directly connect to the processor 740, such as in the case where the northbridge 760 is integrated into the processor 740.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more example designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method comprising:
   receiving, by a physical baseboard management controller (BMC) of a system, a command from an administrator device to collect system debug information, the physical BMC being connected to a Basic Input/Output System (BIOS) and a processor of the system via a southbridge of the system;
   retrieving, by the physical BMC, logged system events from a non-volatile storage of the physical BMC;
   obtaining, by the physical BMC, debug information from a component of the system, in response to receiving the command;
   saving, by the physical BMC, the debug information to a debug file; and
   sending, by the physical BMC, the debug file to the administrator device.

2. The method of claim 1, wherein obtaining the debug information is based on the system events.

3. The method of claim 1, wherein the component is the BIOS and the debug information comprises hardware configuration information for the system.

4. The method of claim 3, further comprising requesting the BIOS to send to the physical BMC the hardware configuration information, in response to receiving the command.

5. The method of claim 3, wherein the BIOS is configured to automatically send on system startup the hardware configuration information to the physical BMC.

6. The method of claim 3, further comprising summarizing the hardware configuration information in a report comprising at least one of central processing unit (CPU) topology, memory topology, expansion slot topology, hardware identification, or hardware network address.

7. The method of claim 1, wherein the component is a graphics unit of the physical BMC and the debug information comprises a screenshot of the system hanging captured by the graphics unit.

8. The method of claim 1, wherein the debug information comprises register settings for at least one of a register of a processor, a south bridge, or another device connected to the processor or the south bridge.

9. The method of claim 1, wherein the component is the BIOS and the debug information comprises a power-on self-test (POST) redirect message.

10. The method of claim 9, further comprising directing the BIOS to enable a debug mode and send the POST redirect message to the physical BMC, in response to receiving the command.

11. The method of claim 10, wherein directing the BIOS includes setting a debug mode BIOS flag to indicate to the BIOS to enter the BIOS debug mode.

12. A system comprising:
a physical baseboard management controller (BMC); and
a non-transitory computer-readable medium including instructions which, when executed by the physical BMC, causes the physical BMC to:
receive, by the physical BMC, a command from an administrator device to collect system debug information, the physical BMC being connected to a Basic Input/Output System (BIOS) and a processor of the system via a Southbridge of the system;
retrieve, by the physical BMC, logged system events from a non-volatile storage of the physical BMC;
obtain debug information from a component of the system, in response to receiving the command;
save the debug information to a debug file; and
send the debug file to the administrator device.

13. The system of claim 12, wherein the component is the BIOS and the debug information comprises hardware configuration information for the system.

14. The system of claim 13, further comprising requesting the BIOS to send to the physical BMC the hardware configuration information, in response to receiving the command.

15. The system of claim 13, wherein the BIOS is configured to automatically send on system startup the hardware configuration information to the physical BMC.

16. The system of claim 12, wherein the component is a graphics unit of the physical BMC and the debug information comprises a screenshot of the system hanging captured by the graphics unit.

17. The system of claim 12, wherein the debug information comprises register settings for at least one of a register of a processor, a south bridge, or another device connected to the processor or the south bridge.

18. The system of claim 12, wherein the component is the BIOS and the debug information comprises a power-on self-test (POST) redirect message.

19. The system of claim 18, further comprising directing the BIOS to enable a debug mode and send the POST redirect message to the physical BMC, in response to receiving the command.

20. The system of claim 19, wherein directing the BIOS includes setting a debug mode BIOS flag to indicate to the BIOS to enter the BIOS debug mode.

* * * * *